(12) United States Patent
Olds et al.

(10) Patent No.: US 8,699,175 B1
(45) Date of Patent: Apr. 15, 2014

(54) DISK DRIVE MAPPING LOW FREQUENCY WRITE ADDRESSES TO CIRCULAR BUFFER WRITE ZONE

(75) Inventors: Edwin S. Olds, Fort Collins, CO (US); William B. Boyle, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 75 days.

(21) Appl. No.: 13/554,994

(22) Filed: Jul. 20, 2012

(51) Int. Cl.
*G11B 5/596* (2006.01)

(52) U.S. Cl.
USPC ...................................... 360/78.14

(58) Field of Classification Search
None
See application file for complete search history.

(56) References Cited

U.S. PATENT DOCUMENTS

| | | | |
|---|---|---|---|
| 7,392,340 B1 * | 6/2008 | Dang et al. ................... | 711/111 |
| 7,417,821 B2 | 8/2008 | Tsuchinaga | |
| 7,549,021 B2 * | 6/2009 | Warren, Jr. ................... | 711/119 |
| 7,617,358 B1 * | 11/2009 | Liikanen et al. ............. | 711/112 |
| 7,620,772 B1 | 11/2009 | Liikanen et al. | |
| 7,653,847 B1 * | 1/2010 | Liikanen et al. ............. | 714/723 |
| 7,685,360 B1 * | 3/2010 | Brunnett et al. ............. | 711/112 |
| 7,747,810 B2 | 6/2010 | Uemura et al. | |
| 7,864,476 B2 | 1/2011 | Ehrlich | |
| 7,982,994 B1 | 7/2011 | Erden et al. | |
| 8,004,785 B1 * | 8/2011 | Tsai et al. ..................... | 360/53 |
| 2002/0186492 A1 * | 12/2002 | Smith ............................ | 360/69 |
| 2005/0069298 A1 | 3/2005 | Kasiraj et al. | |
| 2005/0248867 A1 * | 11/2005 | Choi ............................. | 360/30 |
| 2006/0253621 A1 | 11/2006 | Brewer et al. | |
| 2007/0186029 A1 | 8/2007 | Uemura et al. | |
| 2007/0223132 A1 | 9/2007 | Tsuchinaga | |
| 2008/0239552 A1 * | 10/2008 | Kimura ........................ | 360/75 |
| 2009/0259819 A1 * | 10/2009 | Chen et al. .................. | 711/165 |
| 2010/0030987 A1 * | 2/2010 | Na et al. ...................... | 711/162 |
| 2011/0292538 A1 | 12/2011 | Haga et al. | |
| 2011/0304939 A1 | 12/2011 | Hirata et al. | |
| 2012/0303873 A1 * | 11/2012 | Nguyen et al. .............. | 711/103 |
| 2013/0145223 A1 * | 6/2013 | Okada et al. ................. | 714/54 |

* cited by examiner

*Primary Examiner* — Peter Vincent Agustin

(57) ABSTRACT

A drive is disclosed comprising a head actuated over a disk comprising a plurality of data tracks. A random access write zone is defined on the disk comprising a first plurality of the data tracks, and a circular buffer write zone is defined on the disk comprising a second plurality of the data tracks. Write commands are received comprising logical block addresses (LBAs). First frequency and second frequency write LBAs are identified, where the second frequency is higher than the first frequency. Data associated with the first frequently write LBAs is stored in the circular buffer write zone, and data associated with the second frequency write LBAs is stored in the random access write zone.

16 Claims, 5 Drawing Sheets

DISK DRIVE MAPPING LOW FREQUENCY WRITE ADDRESSES TO CIRCULAR BUFFER WRITE ZONE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 comprising a plurality of servo tracks 4 defined by a number of servo sectors $6_O$-$6_N$, wherein data tracks are defined relative to the servo tracks 4. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

The data sectors are accessed indirectly using logical block addresses (LBAs) mapped to physical block addresses (PBAs) representing the physical location of each data sector. This indirect accessing facilitates mapping out defective data sectors during manufacturing as well as while the disk drive is deployed in the field. Access commands (read/write) received from the host include LBAs which the disk drive maps to corresponding PBAs using any suitable mapping technique.

DETAILED DESCRIPTION

Figure 2A:
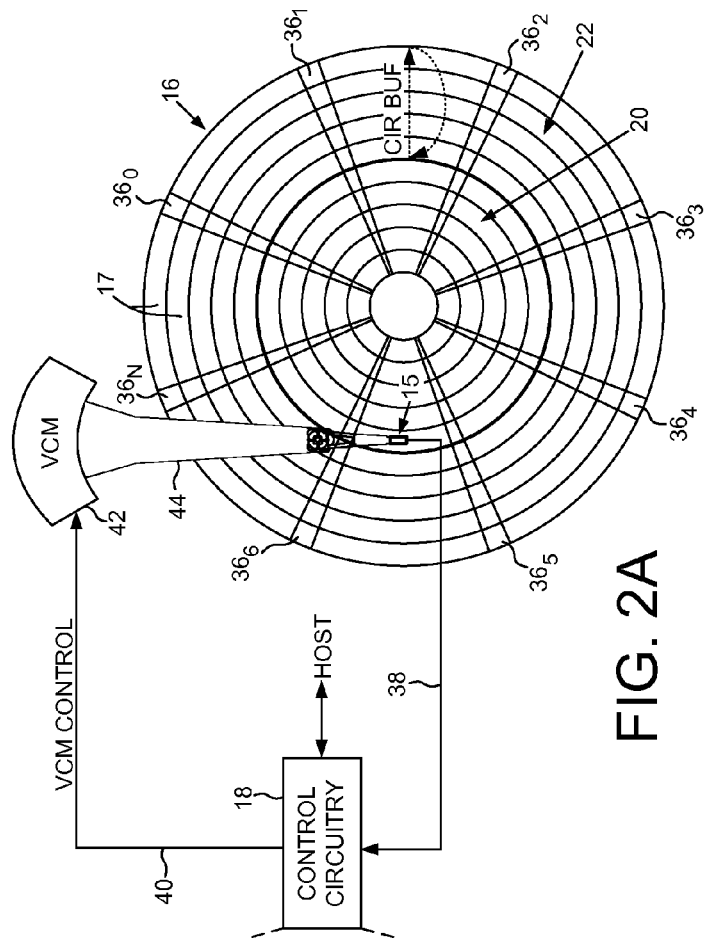
FIG. 2A shows a disk drive according to an embodiment of the present invention comprising a head actuated over a disk.
Figure 2B:
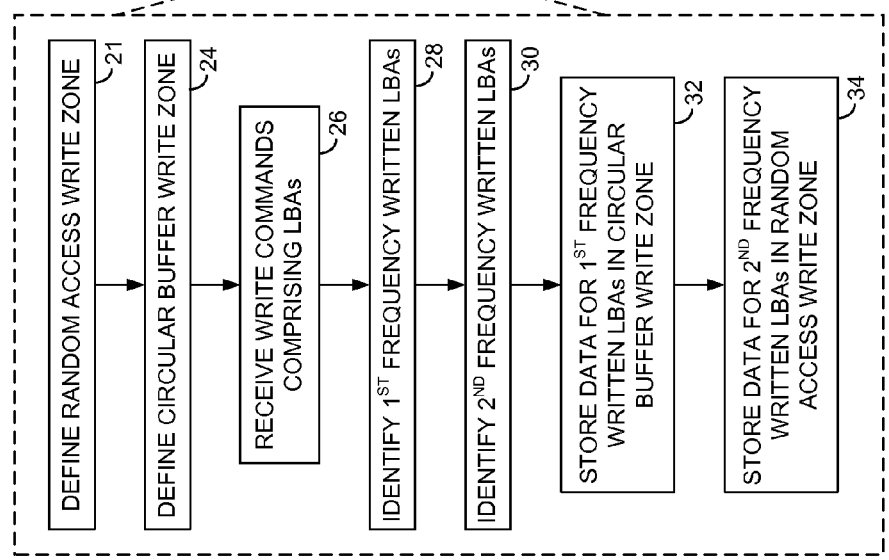
FIG. 2B is a flow diagram according to an embodiment of the present invention wherein data associated with frequently written LBAs is stored in a random access write zone, and data associated with infrequently written LBAs is stored in a circular buffer write zone.

FIG. 2A shows a disk drive according to an embodiment of the present invention comprising a head 15 actuated over a disk 16 comprising a plurality of data tracks 17. The disk drive further comprises control circuitry 18 operable to execute the flow diagram of FIG. 2B, wherein a random access write zone 20 is defined on the disk comprising a first plurality of the data tracks (block 21), and a circular buffer write zone 22 is defined on the disk comprising a second plurality of the data tracks (block 24). Write commands are received comprising logical block addresses (LBAs) (block 26). First frequency write LBAs are identified (block 28), and second frequency write LBAs are identified (block 30), where the second frequency is higher than the first frequency. Data associated with the first frequency write LBAs is stored in the circular buffer write zone (block 32), and data associated with the second frequency write LBAs is stored in the random access write zone (block 34).

Figure 1:
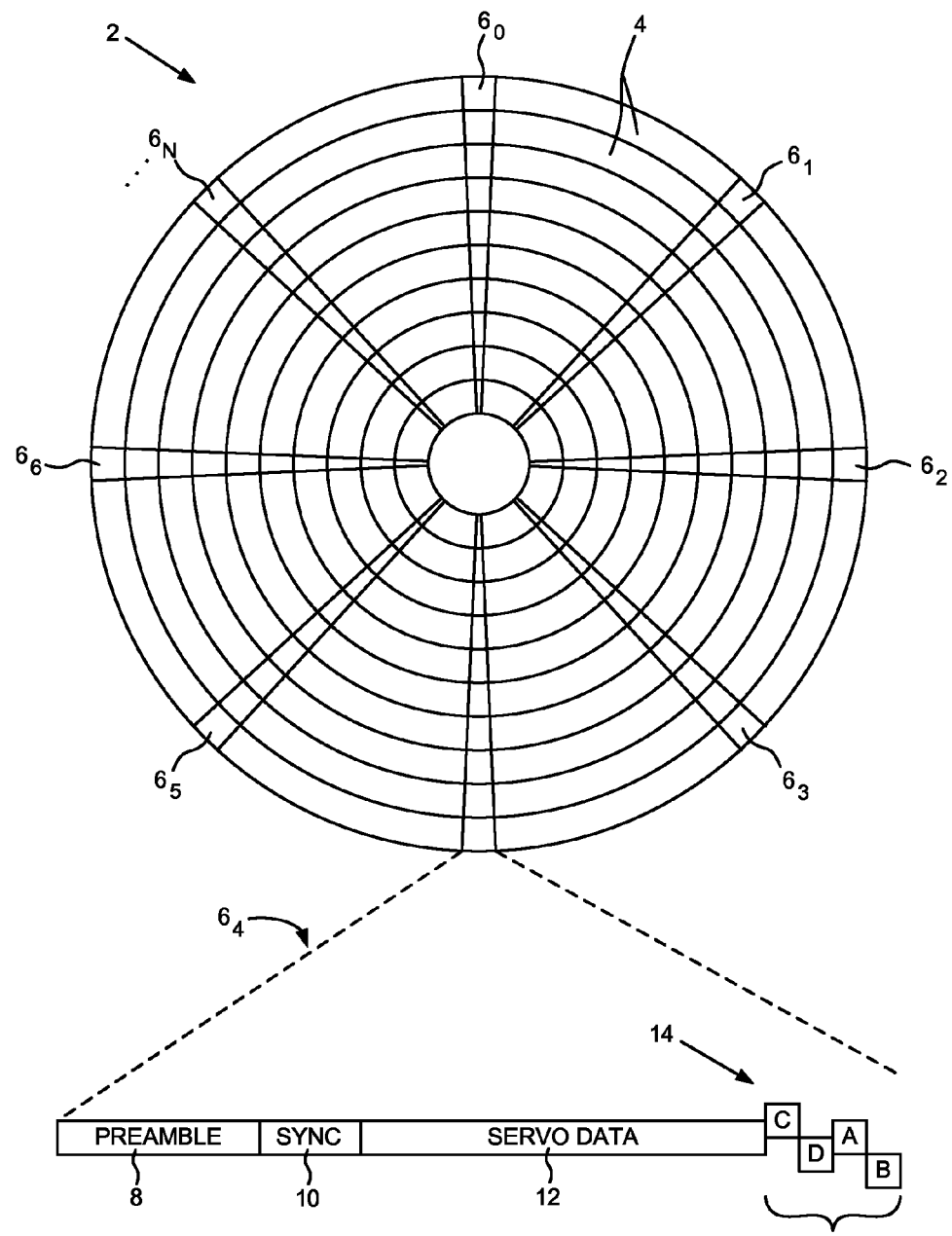
FIG. 1 shows a prior art disk format comprising a plurality of servo tracks defined by servo sectors.

In the embodiment of FIG. 2A, the plurality of data tracks 17 are defined relative to servo sectors $36_O$-$36_N$ recorded on the disk 16. The control circuitry 18 processes a read signal 38 emanating from the head 15 to demodulate the servo sectors $36_O$-$36_N$ and generate a position error signal (PES) representing an error between the actual position of the head and a target position relative to a target track. The control circuitry 18 filters the PES using suitable compensation filters to generate a control signal 40 applied to a voice coil motor (VCM) 42 which rotates an actuator arm 44 about a pivot, thereby actuating the head 15 radially over the disk 16 in a direction that reduces the PES. The servo sectors $36_O$-$36_N$ may comprise any suitable position information, such as a track and wedge address for coarse positioning and servo bursts for fine positioning as described above with reference to FIG. 1. The servo bursts may comprise any suitable pattern, such as an amplitude based servo pattern as shown in FIG. 1, or a suitable phase based servo pattern.

The control circuitry 18 maps LBAs to the PBAs of data sectors in the random access write zone 20 shown in FIG. 2A using static allocation such that when an LBA is overwritten, the data is written to the same PBA (unless the PBA becomes defective in which case the LBA is mapped to a spare PBA). The control circuitry 18 maps LBAs to the PBAs of data sectors in the circular buffer write zone 22 using dynamic allocation such that when an LBA is overwritten, the data is written to the PBA at the head of the circular buffer rather than to the previously mapped PBA (the previously mapped PBA is marked as invalid). During a garbage collection operation, the data stored in valid PBAs at the tail of the circular buffer are relocated to the PBAs at the head of the circular buffer, thereby freeing space at the tail of the circular buffer. Eventually the head of the circular buffer wraps around to the tail so that the previously written (and garbage collected) data tracks can be overwritten.

Figure 3A:
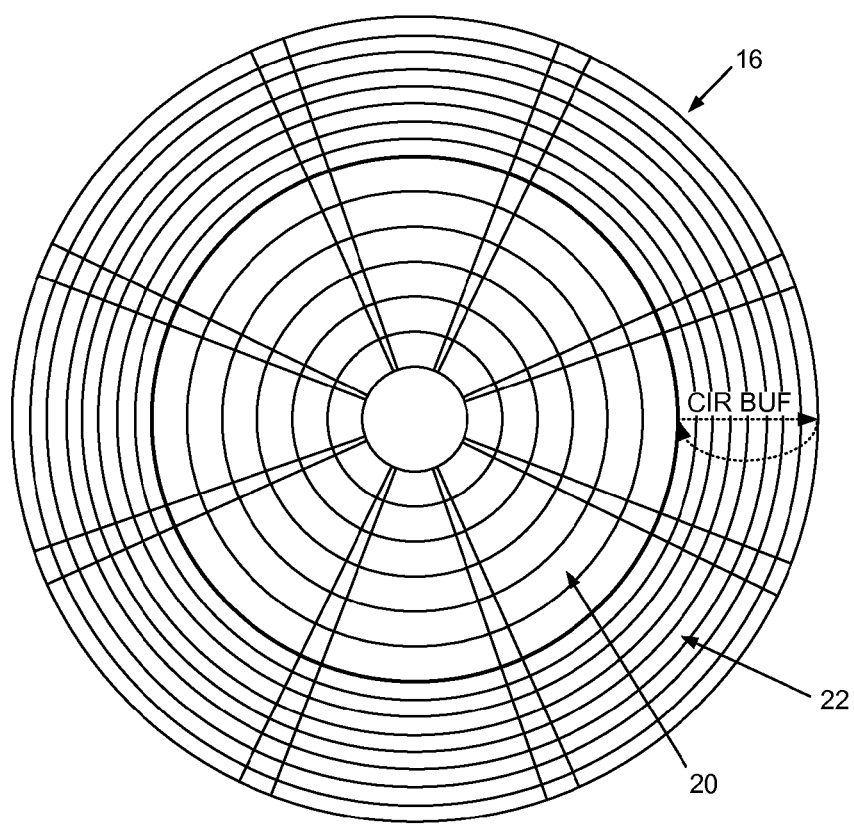
FIG. 3A shows an embodiment of the present invention wherein the random access write zone comprises non-shingled data tracks, and the circular buffer write zone comprises shingled data tracks.
Figure 3B:
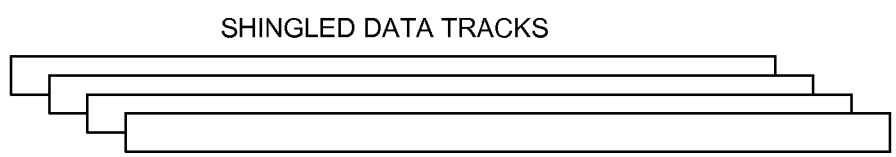
FIG. 3B illustrates shingled data tracks that achieve a higher radial density according to an embodiment of the present invention.

In an embodiment shown in FIG. 3A, the data tracks in the circular buffer write zone 22 are shingled by writing the data tracks in an overlapping manner. Overlapping the data tracks increases the radial density of the shingled data tracks, thereby increasing the capacity of the disk drive. The shingled data tracks are written as a circular buffer as illustrated in FIG. 3A, wherein the data tracks are written from the inner diameter toward the outer diameter (or vice versa), and a newly written data track partially overwrites the previously written data track as illustrated in FIG. 3B. When the last data track is reached, the writing begins again by overwriting the first data track at the inner diameter, and then continuing to write toward the outer diameter.

In one embodiment, frequently written LBAs are written to the non-shingled data tracks of the random access write zone 20 and infrequently written LBAs are written to the shingled data tracks of the circular buffer write zone 22. This increases the overall capacity of the disk drive since the radial density of the shingled data tracks may be significantly higher than the radial density of the non-shingled data tracks. The performance of the disk drive is not impacted significantly by the garbage collection performed on the circular buffer write zone 22 since the frequency of writes is low. That is, the garbage collection can be executed infrequently between long intervals, or the garbage collection can be executed continuously with frequent interruptions in order to service host access commands. Since the frequency of writes to the circular buffer write zone 22 is low, the garbage collection is able to maintain adequate free space in the circular buffer for future write commands without interfering with the throughput of the host access commands.

In another embodiment, the lower radial density of the data tracks in the random access write zone 20 may increase performance by avoiding (or reducing) the need to perform write verify operations, whereas the higher radial density of the shingled data tracks in the circular buffer write zone 22 may reduce performance due to a need to perform write verify operations. Storing data associated with infrequently written LBAs in the shingled data tracks of the circular buffer write zone 22 reduces the frequency of corresponding write verify operations while increasing the overall capacity of the disk drive.

Figure 4:
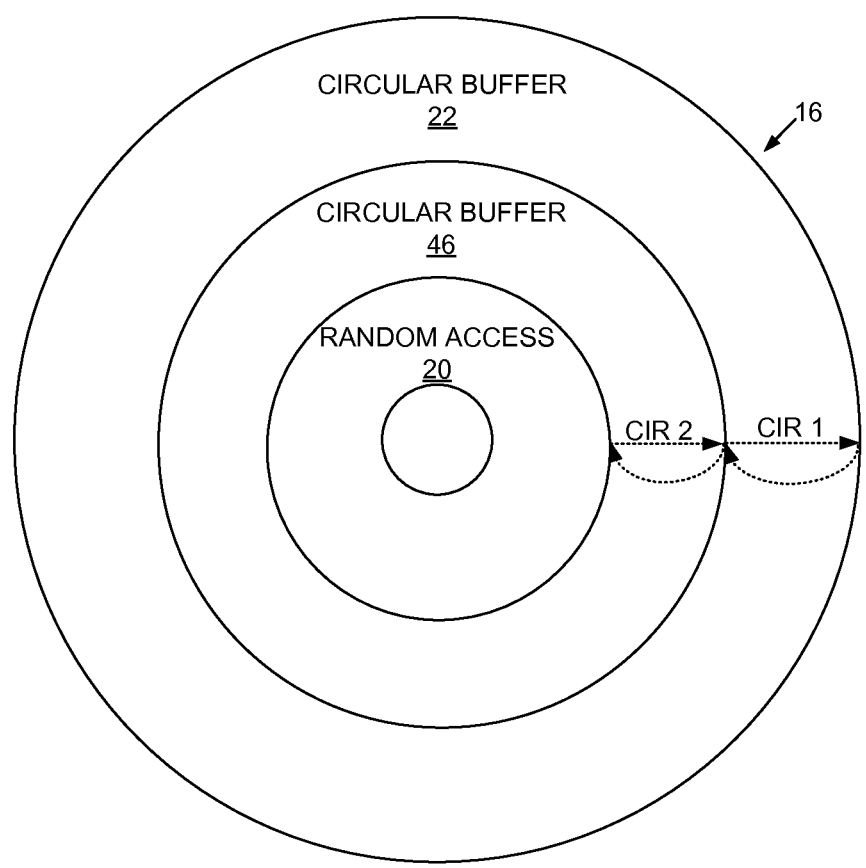
FIG. 4 shows a disk format comprising a first circular buffer write zone for storing first frequency write LBAs, a random access write zone for storing second frequency write LBAs, and a second circular buffer write zone for storing third frequency write LBAs according to an embodiment of the present invention.

FIG. 4 shows another embodiment of the present invention wherein the disk 16 comprises a first circular buffer write zone 22 and a second circular buffer write zone 46. In one embodiment, the data tracks in the second circular buffer write zone 46 are recorded at a low enough radial density (shingled or non-shingled) to avoid (or reduce) the need to perform write verify operations. In this embodiment, the data associated with high frequency write LBAs may be stored in the random access write zone 20, the data associated with low frequency write LBAs stored in the first circular buffer write zone 22, and the data associated with medium frequency write LBAs stored in the second circular buffer write zone 46. The frequency of writes to both the first and second circular buffer write zones 22 and 46 is low enough so that the resulting garbage collection does not significantly impact the performance of the disk drive. The frequency of writes to the first circular buffer write zone 22 is low enough to allow write verify operations without significantly impacting the performance of the disk drive.

In another embodiment, data associated with very high frequency write LBAs may be written to the second circular buffer write zone 46 shown in FIG. 4, whereas data associated with very low frequency write LBAs may be stored in the first circular buffer write zone 22, and data associated with medium frequency write LBAs stored in the random access write zone 20. Writing very high frequency write LBAs to the second circular buffer write zone 46 may improve performance by avoiding the seek operations that would otherwise be required when writing to the random access write zone 20. In addition, since the LBAs assigned to the second circular buffer write zone 46 are written with a high frequency, the amount of valid data sectors needing to be relocated during the garbage collection operation is minimal. That is, most of the data sectors in the older data tracks will eventually become invalid due to the corresponding LBAs being overwritten, and therefore there will be very few data sectors that need relocating to the head of the circular buffer during the garbage collection operation.

In one embodiment, the radial density of the data tracks in the second circular buffer write zone 46 is selected low enough to avoid (or reduce) the need to perform write verify operations, whereas a high radial density (e.g., shingled) is selected for the first circular buffer write zone 22 to increase the capacity of the disk drive. Since the first circular buffer write zone 22 is used to store data associated with infrequently written LBAs, the frequency of write verify operations performed on the first circular buffer write zone 22 is reduced and therefore does not significantly impact the performance of the disk drive.

Figure 5:
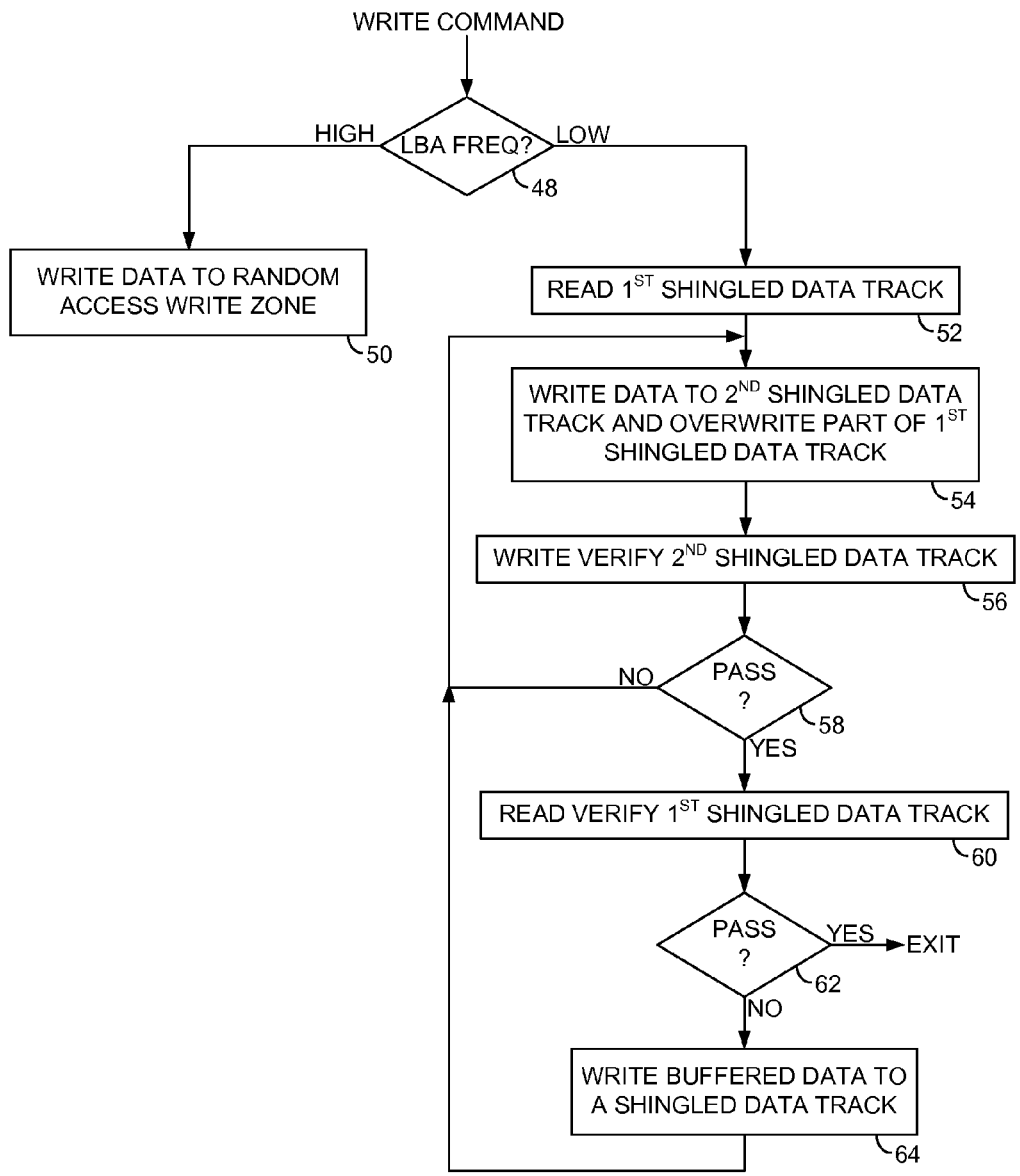
FIG. 5 is a flow diagram according to an embodiment of the present invention wherein when writing data to shingled data tracks of the circular buffer write zone, the previously written data track is read and then verified after being overwritten.

FIG. 5 is a flow diagram according to an embodiment of the present invention wherein when a write command is received, the LBA(s) is evaluated (block 48). If the LBA of the write command is a frequently written LBA, the data is written to the random access write zone 20 without performing a write verify operation (block 50). If the LBA of the write command is an infrequently written LBA (bock 48), the data is written to a shingled data track of the circular buffer write zone 22. Prior to overwriting a first shingled data track with the write data of the write command, the first shingled data track is read and the read data buffered (block 52). The write data is then written to a second shingled data track which overwrites at least part of the first shingled track (block 54). An optional write verify operation is executed on the second shingled data track to verify the recoverability of the written data (block 56). If the second shingled data track does not pass the write verify operation (block 58), the write data is again written to the second shingled data track until passing the write verify operation. After passing the write verify operation, the first (overwritten) shingled data track is read to verify recoverability (block 60). If the first shingled data track does not pass the read verify (block 62), the buffered data read from the first shingled data track (at block 52) is written to a shingled data track (block 64).

In one embodiment, the buffered data read from the first shingled data track (at block 52) may be written to the next shingled data track at the head of the circular buffer after skipping a data track so that the second shingled data track is not overwritten. This embodiment leaves two blank data tracks on each side of the second shingled data track that are eventually recovered during the garbage collection operation. In one embodiment, if the first (overwritten) data track fails the read verify operation a predetermined number of times, it may be mapped out as defective.

In one embodiment, the mapping of LBAs based on the frequency of writes may change over time based on any suitable metric, such as a performance metric or a capacity metric. For example, in one embodiment the number of LBAs mapped to either the random access write zone 20 or the circular buffer write zone 22 may vary over time based on the free space available in either storage area. If the free space in the random access write zone 20 falls below a predetermined threshold, the threshold for discriminating between the high/low frequency write LBAs may be adjusted so that more of the LBAs are mapped to the circular buffer write zone 22 when servicing write commands. Conversely, more of the LBAs may be mapped to the random access write zone 20 if the free space in the circular buffer write zone 22 falls below a predetermined threshold. In one embodiment, data may be migrated between the two write zones during a background operation (and the LBAs remapped) in order to better balance the free space of the two write zones.

In another embodiment, a performance metric of the disk drive may be monitored, such as by measuring an average throughput of host access commands serviced by the disk drive. If the performance metric degrades below a threshold due to an excessive number of garbage collection and/or write verify operations performed on the circular buffer write zone 22, the threshold for discriminating between the high/low frequency write LBAs may be adjusted so that more of the LBAs are mapped to the random access write zone 20. Conversely, more of the LBAs may be mapped to the circular buffer write zone 22 if the performance metric rises above a predetermined threshold.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of data tracks;
   a head actuated over the disk; and
   control circuitry operable to:
   define a random access write zone on the disk comprising a first plurality of the data tracks;
   define a first circular buffer write zone on the disk comprising a second plurality of the data tracks;
   receive write commands comprising logical block addresses (LBAs);
   identify first frequency write LBAs;
   identify second frequency write LBAs, where the second frequency is higher than the first frequency;
   store data associated with the first frequency write LBAs in the first circular buffer write zone; and
   store data associated with the second frequency write LBAs in the random access write zone.

2. The disk drive as recited in claim 1, wherein:
   the first plurality of data tracks are recorded at a first radial density; and
   the second plurality of data tracks are recorded at a second radial density higher than the first radial density.

3. The disk drive as recited in claim 2, wherein the first plurality of data tracks comprises non-shingled data tracks.

4. The disk drive as recited in claim 2, wherein the second plurality of data tracks comprises shingled data tracks.

5. The disk drive as recited in claim 4, wherein the control circuitry is further operable to:
   not perform a write verify operation on data written to the first plurality of data tracks; and
   perform a write verify operation on data written to the second plurality of data tracks.

6. The disk drive as recited in claim 5, wherein the control circuitry is further operable to:
   overwrite at least part of a first shingled data track when writing data to a second shingled data track in the second plurality of shingled data tracks; and
   after overwriting at least part of the first shingled data track, verify recoverability of the first shingled data track.

7. The disk drive as recited in claim 6, wherein prior to overwriting at least part of the first shingled data track the control circuitry is further operable to read data from the at least part of the first shingled data track and buffer the data.

8. The disk drive as recited in claim 1, wherein the control circuitry is further operable to:
   define a second circular buffer write zone on the disk comprising a third plurality of the data tracks;
   identify third frequency write LBAs, wherein the third frequency is higher than the second frequency;
   store data associated with the third frequency write LBAs in the second circular buffer write zone.

9. A method of operating a disk drive, the disk drive comprising a head actuated over a disk comprising a plurality of data tracks, the method comprising:
   defining a random access write zone on the disk comprising a first plurality of the data tracks;
   defining a first circular buffer write zone on the disk comprising a second plurality of the data tracks;
   receiving write commands comprising logical block addresses (LBAs);
   identifying first frequency write LBAs;
   identifying second frequency write LBAs, where the second frequency is higher than the first frequency;
   storing data associated with the first frequency write LBAs in the first circular buffer write zone; and
   storing data associated with the second frequency write LBAs in the random access write zone.

10. The method as recited in claim 9, wherein:
    the first plurality of data tracks are recorded at a first radial density; and
    the second plurality of data tracks are recorded at a second radial density higher than the first radial density.

11. The method as recited in claim 10, wherein the first plurality of data tracks comprises non-shingled data tracks.

12. The method as recited in claim 10, wherein the second plurality of data tracks comprises shingled data tracks.

13. The method as recited in claim 12, further comprising:
    not performing a write verify operation on data written to the first plurality of data tracks; and
    performing a write verify operation on data written to the second plurality of data tracks.

14. The method as recited in claim 13, further comprising:
    overwriting at least part of a first shingled data track when writing data to a second shingled data track in the second plurality of shingled data tracks; and
    after overwriting at least part of the first shingled data track, verifying recoverability of the first shingled data track.

15. The method as recited in claim 14, wherein prior to overwriting at least part of the first shingled data track further comprising reading data from the at least part of the first shingled data track and buffer the data.

16. The method as recited in claim 9, further comprising:
defining a second circular buffer write zone on the disk comprising a third plurality of the data tracks;
identifying third frequency write LBAs, wherein the third frequency is higher than the second frequency;
storing data associated with the third frequency write LBAs in the second circular buffer write zone.

\* \* \* \* \*